July 23, 1968 N. J. HARRICK 3,393,603
VERTICAL DOUBLE-PASS MULTIPLE REFLECTION CELL
FOR INTERNAL REFLECTION SPECTROSCOPY
Filed April 1, 1965 2 Sheets-Sheet 1
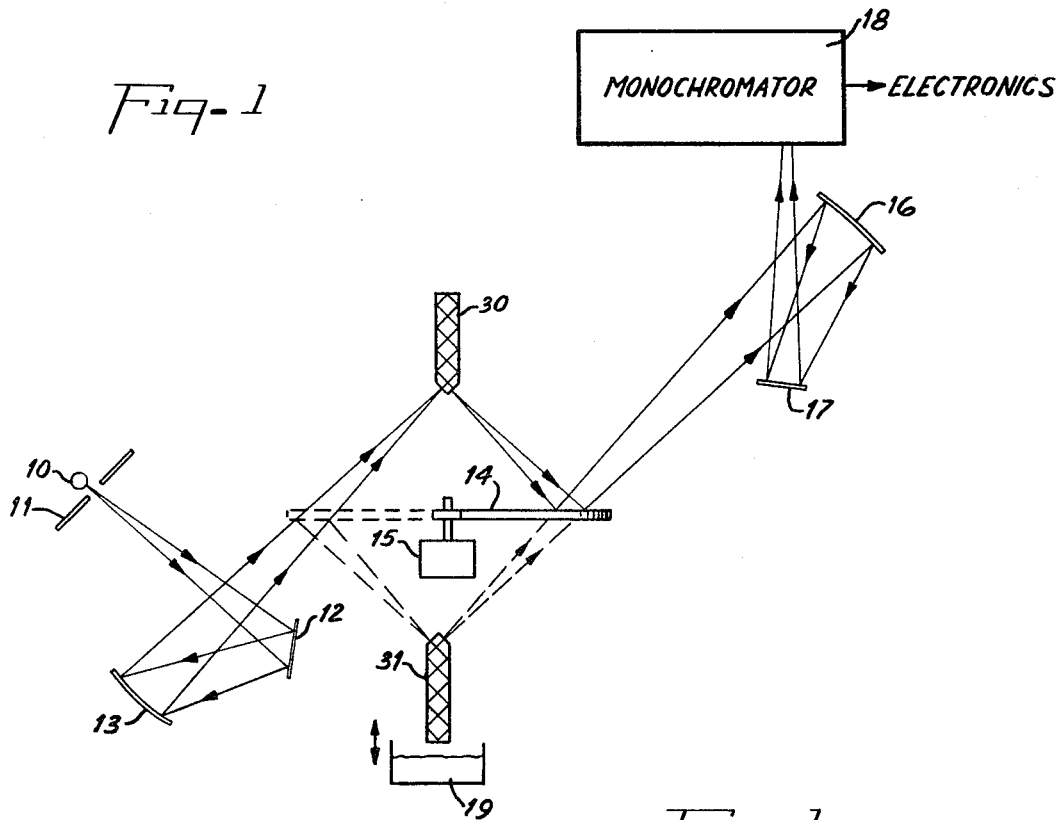
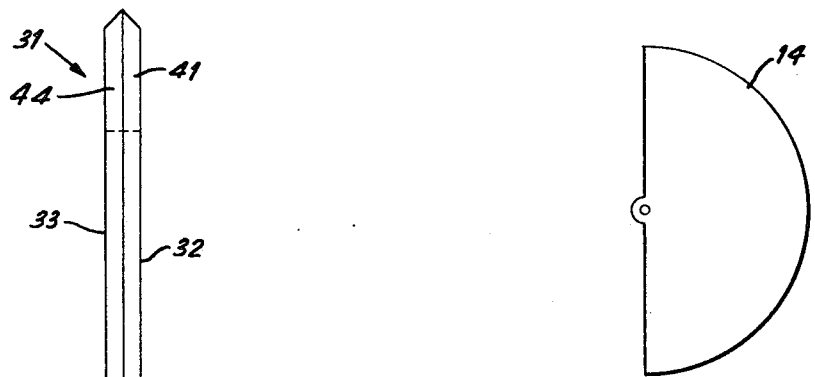
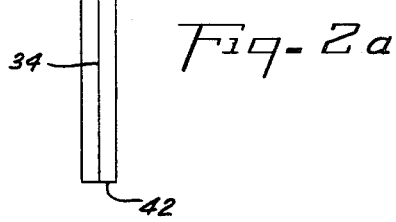
INVENTOR.
N. J. HARRICK
BY
AGENT July 23, 1968 N. J. HARRICK 3,393,603
VERTICAL DOUBLE-PASS MULTIPLE REFLECTION CELL
FOR INTERNAL REFLECTION SPECTROSCOPY
Filed April 1, 1965 2 Sheets-Sheet 2

INVENTOR.
N. J. HARRICK
BY
Frank R Trifari
AGENT

United States Patent Office 3,393,603
Patented July 23, 1968

3,393,603
VERTICAL DOUBLE-PASS MULTIPLE REFLECTION CELL FOR INTERNAL REFLECTION SPECTROSCOPY
Nicolas J. Harrick, Ossining, N.Y., assignor to North American Philips Company, Inc., New York, N.Y., a corporation of Delaware
Filed Apr. 1, 1965, Ser. No. 444,589
8 Claims. (Cl. 88—14)

ABSTRACT OF THE DISCLOSURE

A double-pass multiple reflection cell for use in an instrument for internal reflection spectroscopy. The cell comprises a vertically-arranged plate-like body having an entrance surface for radiation at an upper edge. The surface of the cell opposite the entrance face is inclined at a 45° angle. The incident radiation propagates horizontally by multiple reflections from the opposite major surfaces of the cell and then is deflected vertically downward by the inclined surface. The beam continues to propagate by multiple reflections twice through the cell and on its return path is again deflected by the inclined surface along a horizontal path which allows it to exit from the cell. The cell can be used as a simple replacement for prior art cells without altering the optics of the instrument, while simplifying the immersion of the cell surfaces into the sample to be analyzed.

---

This invention relates to an improved double-pass multiple reflection cell for internal reflection spectroscopy.

The use of multiple reflection cells for internal reflection spectroscopy has been described in detail in my paper published January 1964 in vol. 36, No. 1, pages 188 to 191 of "Analytical Chemistry." In connection with FIG. 3 of that paper, I describe the construction and use of double-pass cells which have been found very convenient in this multiple reflection technique. Among the advantages are that the beam undergoes twice as many reflections increasing the sensitivity by a factor of two, the entrance and exit beams pass through a common pivot point making optical alignment much easier, and the measurement of the spectra of fluent material, such as liquids or powders, or monitoring reactions therein, is simplified, since the free end of the cell is readily dipped directly in a beaker or other container of the material involved and no additional windows or seals are required.

As further explained on page 191, I prefer to use a single cell double-beam spectrometer such techniques because of the enhanced sensitivity and the cancellation of source fluctuations and atmospheric absorption bands possible. One such arrangement is illustrated in FIG. 5 of my paper. I have since that time also successfully used other double-beam systems in which two cells were present in a balanced arrangement, and one or more rotating sectored mirrors were employed to direct a single beam from a single source alternately through one double-pass cell serving as a sample and then through the other double-pass cell serving as a reference. The rotating mirrors thereby act as a beam splitter prior to the cells and as a beam recombiner subsequent to the cells, the recombined beam then being focused onto the slit of a conventional monochromator. In this arrangement, it was found most convenient to arrange the two cells so as to extend horizontally at opposite sides of a diamond formed by the bevelled ends of the cells and the reflecting parts of the sectored mirror. In this position, difficulties were encountered in providing the sample in contact with the surfaces of the sample cell. My above-noted paper suggests the use of additional plane mirrors to modify the optics so that the single cell double-beam arrangement illustrated therein can be arranged vertically. The use of additional mirrors in the two cell double-beam arrangement, however, would be extremely complicating because of the lack of available space, and would also complicate alignment of the system.

A principal object of the invention is a double-pass multiple reflection cell, which can be arranged vertically, for receiving a beam in a horizontal plane and for transmitting the beam in that same plane without the use of external mirrors and the like.

Briefly speaking, I have been able to satisfy the foregoing object by the surprisingly simple expedient of bevelling the long edge of the cell to provide a roof prism structure, rather than the short edge as described in my aforementioned paper, and cutting the end of the cell at a 45° angle so as to provide a totally reflecting diagonal surface opposite to the long bevelled edge of the cell. The horizontal beam enters the cell at the upper end substantially normal to the bevelled edge and, after propagating horizontally by multiple reflections, impinges on the 45° cut surface from which it is totally reflected onto the adjacent large area or major surface from which it then reflects onto the opposite major surface and so on, propagating downward through the cell in a substantially vertical plane. The beam totally reflects off the bottom surface and propagates upward via a similar path, reflects off of the 45° diagonal surface a second time and exits out from the cell via the other bevelled edge in a generally horizontal plane. It was remarkable to find that despite the circuitous path involved, the beam remains confined within the cell and multiply reflects from the large or major area surfaces as required without being lost, and exits from the cell substantially in the same horizontal plane from which it entered the cell. Accordingly, such cells are very suitable for use in a two-cell balanced double-beam spectrometer system and readily permit the sample cell to be dipped into containers containing the material to be analyzed.

The invention will now be described with reference to the accompanying drawings in which:

FIG. 1 is a schematic view of a balanced double beam spectrometer in which my new cells are very suitable for use;

FIG. 1a is an elevational view of a sectored mirror used in the spectrometer of FIG. 1;

FIGS. 2a and 2b are front and side elevational views, respectively, of my new cell;

Figure 2B:
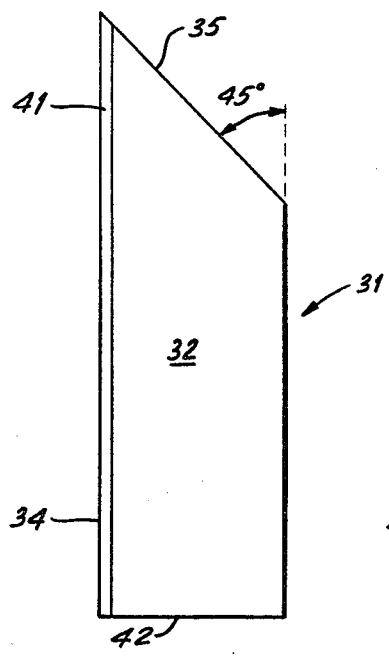

Before describing my novel cell, it would be helpful to describe briefly a two-cell balanced double-beam spectrometer in which such cells have been used very satisfactorily. As shown in FIG. 1, it includes a suitable light source 10 of the infrared radiation which projects light through a slit 11 onto a plane mirror 12 from which it reflects onto a focusing mirror 13 which focuses the beam onto the entrance aperture of a double-pass reference cell 30. Located opposite the reference cell 30 is a sample cell 31. The beam is alternately focused onto the entrance aperture of the sample cell 31, and that of the reference cell 30 by means of a single rotating sectored mirror 14, which is silvered on both sides. The sector is one-half of a circle, as shown in FIG. 1a. A motor 15 is provided for rotating the mirror 14. This single mirror 14 acts as a beam splitter and a beam recombiner, which is illustrated by the two light paths shown, one in solid lines and the other in dashed lines. As will be evident, when the sectored mirror is in the position shown in solid lines in which the focused light beam from the mirror 13 is unimpeded, and the light can impinge on the entrance aperture of the reference cell 30, then the exiting beam from the cell 30 will impinge on a solid reflecting surface part of the mirror. FIG. 1a is an elevational view of the sectored mirror alone in this position. When the sectored mirror 14 has rotated one-half a revolution to the position shown in dotted lines, the focused beam from the mirror 13 will be reflected therefrom (see dashed line path) onto the entrance aperture of the sample cell 31, but the exiting beam from the latter, in this case, will continue unimpeded. In either case, the beam returns to and is recombined in a path which carries it onto a further focusing mirror 16 and plane mirror 17 from which it is focused onto the entrance slit of a monochromator 18. The output of the latter is supplied to the usual electronics associated therewith, which generally includes an X–Y recorder, which produces a graph of the detected infrared radiation power as a function of the wavelengths in the detected beam. Since the split beam travels equal paths through equal media, the effects of atmospheric absorptions and absorptions common to both cells can be cancelled out. Other unbalances in the system can be compensated for by variable attenuators which may be placed in the light path of the more transparent cell. Thus, in the absence of a material to be analyzed, a null or balanced condition is established. When materials are deposited onto the surface of the sample cell 31, this null condition is disturbed creating an unbalance, and an output is obtained which can be utilized in the conventional manner.

As will be observed, the optical geometry is in a generally horizontal plane. For ease of contacting the surfaces of the sample cell with the material to be analyzed, it is desirable that the latter extend in a vertical plane. My novel cell enables this result to be achieved. FIGS. 2a and 2b are front and side elevational views, respectively, of my new cell. As shown, the cell comprises a thin, flat plate 31 with closely spaced opposed major surfaces 32 and 33, which is to be contacted by the sample to be analyzed. The plates may be constructed from any of a number of well-known infrared transparent materials, such as Ge, Si, KRS–5 and AgCl. High index materials are preferred as they offer a wide choice of angle of incidence and thus many reflections are possible. As the reflections occur off of plane surfaces, the optics are simplified. My above-noted publication in "Analytical Chemistry," whose contents are hereby incorporated by reference, gives many examples of suitable materials for the plates, including typical thicknesses and lengths and their parameters that determine their mode of operation. In the case of my novel cell, the long edge 34 is bevelled forming a roof prism structure, rather than the short edge as in the prior art cell, though only the portion of the bevel near the upper end of the cell is actually employed as the entrance and exit apertures, and this is the only requirement. For simplicity, the entire edge is bevelled. Opposite the bevelled upper edge of the cell is cut, starting at the top of the bevelled edge, a 45° diagonal surface 35 which extends normal to the major surfaces 32 and 33. The light enters the cell at the bevelled portion opposite this diagonal surface 35.

Figure 4:
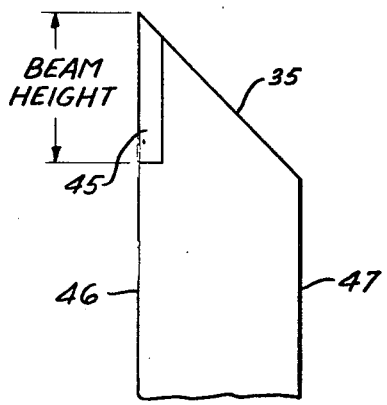
FIG. 4 shows a modification.
Figure 3:
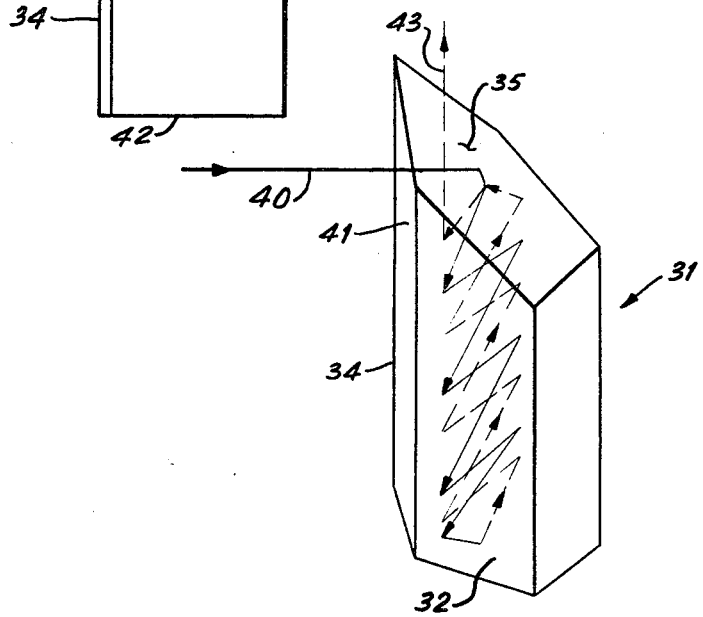
FIG. 3 is a perspective view of the cell illustrated in FIG. 2, and also illustrating the beam paths.

The operation is illustrated in FIG. 3, which is a perspective view of the cell illustrated in FIGS. 2a and 2b. The entrance beam 40 in a generally horizontal plane impinges substantially normally on one surface 41 defining the bevelled edge 34 and thus enters the cell 31. The light propagates horizontally via multiple reflections from the major surfaces 32 and 33 until it strikes the diagonal surface 35. It is then deflected downward and now propagates vertically by multiple reflections from the major surfaces 32 and 33 until it strikes the bottom surface 42 where it is totally reflected. Only a few of the reflections are shown in the figure for the sake of clarity. The beam then returns upward by multiple reflections along similar paths, again reflects off of the diagonal surface 35, and propagates horizontally by multiple reflection from the major surfaces 32 and 33 until it reaches and finally leaves the cell by the other face 44 of the bevelled edge. The exiting beam 43 is again substantially normal to that last face 44 and extends in the same horizontal plane as the entrance beam. While in principle the angle of incidence of the entrance beam onto the major surface 33 can be chosen so that the light beam enters and leaves via a symmetrical light path, i.e., the points of reflection on the opposing major surfaces 32 and 33 are directly opposite each other, in actual practice where the light is not highly collimated and for long light paths within the cell, the light will actually fill the entire plate or cell and equal quantities will leave from the two bevelled faces 41, 44. The expedients described in my previously-mentioned papers, which are illustrated in FIG. 3c thereof, can be used to reduce the radiation which emerges and is directed back towards the source. It is not necessary that the angle of incidence for my novel cell be limited to an angle of 45°. So long as the 45° diagonal surface 35 is employed, the range of angles of incidence which can be employed is the same as that for the horizontal double-pass cells described in my above-noted paper; that is, from the critical angle to 90° minus the critical angle. In case the width of the cell 31 (the horizontal dimension in FIG. 2b) is comparable with the height (slit height) of the beam, it will be desirable to limit the bevelled portion 34 to the top portion of the plate 31 opposite the diagonal surface 35. The remainder of that edge should be polished flat and parallel to the opposite long edge of the plate. This construction will assist in retaining the light within the cell via total internal reflection. FIG. 4 illustrates this modification, with 45 showing the reduced height of the bevelled portion. The long edges 46 and 47 are flat and parallel to one another.

It has surprisingly been found that the transmission characteristics of my vertical cell are approximately the same as that of the horizontal cell, even though the path lengths are much more complicated. As a consequence, an analysis of liquids and powder samples is greatly facilitated, because the vertical cell can be immersed directly into the material being analyzed (shown at 19 in FIG. 1), and thus the latter can be examined in its natural state. In addition, no major modifications in the spectrometer are necessary; the vertical orientation of the spectrometer slits is maintained and no undue alignment problems are encountered. I have found that such vertical cells can be directly substituted for horizontal cells with no modifications in the optical instrumentation necessary.

It will further be evident that the bevelled edge 41 in the form of planar surfaces can be replaced by the curved hemi-cylindrical, entrance and exit surfaces illustrated in FIG. 3b and FIG. 3d of my above-noted paper and still obtain the desired results. That structure offers the advantages of permitting an adjustment of the angle of incidence and also the number of reflections. Other modifications will be evident to those skilled in this art, and I wish it to be understood that I do not intend to be limited by the specific examples recited herein. Thus, while I have described my invention in connection with specific embodiments and applications, other modifications thereof will be readily apparent to those skilled in the art without departing from the spirit and scope of the invention as defined in the appended claims.

What is claimed is:

1. A double-pass multiple reflection cell comprising a thin, elongated body of substantially radiation transparent material having plane, parallel, major side surfaces extending in the longitudinal direction of the body and defining long edge surfaces extending also in the longitudinal direction of said body and connecting the major side surfaces, a portion of the long edge surface of the body adjacent one end thereof being contoured for receiving a beam of radiation, the end portion of the body opposite said receiving portion forming a 45° inclined surface for internally reflecting the incident beam in the longitudinal direction of the body, said body being positioned in such manner relative to the incident beam that the latter remains substantially confined within the body by internal reflections while propagating through the body in its longitudinal direction away from said one end and then back toward said one end and exiting from the body in the vicinity of the edge surface portion where the beam is received.

2. A cell as set forth in claim 1, wherein the radiation is infrared radiation, and the body material has a high index of refraction.

3. A double-pass multiple reflection cell comprising a thin, elongated, plate-like body of substantially radiation transparent material having plane, parallel, major side surfaces extending in the longitudinal direction of the body and defining long edge surfaces extending also in the longitudinal direction of said body and connecting the major side surface, a portion of the long edge surface of the body adjacent one end thereof being contoured to form entrance and exit faces for receiving and transmitting, respectively, a beam of radiation, the end portion of the body opposite said receiving portion forming a 45° diagonal surface for internally reflecting the incident beam in the longitudinal direction of the body, said body being positioned relative to the incident beam so that the beam impinges on internal surfaces of the body at an angle greater than the critical angle and thus remains substantially confined within the body by internal reflections while propagating through the body in its longitudinal direction away from said one end and then back toward said one end and exiting from the body at the exit face.

4. A double-pass cell as set forth in claim 3 wherein the said portion of the long edge surface of the body has a roof prism structure forming the entrance and exit faces.

5. A double-pass cell as set forth in claim 3 wherein the surface of the body at its opposite end is planar and extends in a plane parallel to the plane formed by the incident and exiting beams.

6. A cell as set forth in claim 3 wherein the width of the body is comparable with the height of the radiation beam, and the entrance and exit faces have a length comparable with the said beam height, the remainder of said long edge surface of the body being cut parallel to the opposite long edge surface to assist in confining the beam within the body.

7. In an internal reflection spectrometer wherein the main beam paths are horizontal, a vertical double-pass multiple reflection cell comprising a thin, elongated body of radiation transparent material having plane, parallel, major side surfaces extending vertically in the longitudinal direction of the body and defining long edge surfaces extending also in the longitudinal direction of said body and connecting the major side surfaces, a portion of the long edge surface of the body adjacent the upper end thereof being contoured for receiving a beam of radiation, said upper end portion of the body opposite said receiving portion forming a 45° inclined surface for internally reflecting the horizontal incident beam vertically and downward in the longitudinal direction of the body, said body being positioned relative to the incident beam so that the latter remains confined within the body by internal reflections while propagating through the body in its longitudinal and vertical direction first downward away from said upper end and then upward back toward said upper end to be redeflected by the incline surface horizontally to exit from the body in the vicinity of the edge surface portion where the beam is received, said exiting beam being approximately in the same horizontal plane as said entrance beam.

8. The spectrometer set forth in claim 7 wherein means are provided for immersing the vertical cell in a supply of a sample to be analyzed.

References Cited

Harrick, Multiple Reflection Cells for IRS, Anal. Chem., vol. 36, No. 1, January 1964, pp. 188–191.

JEWELL H. PEDERSEN, *Primary Examiner.*

B. J. LACOMIS, *Assistant Examiner.*